(12) United States Patent
Kelkar et al.

US010195594B2

(10) Patent No.: US 10,195,594 B2
(45) Date of Patent: Feb. 5, 2019

(54) MESOPOROUS MFI-ZEOLITE CATALYSTS, METHODS OF PREPARING THE SAME AND USES

(71) Applicants: The Coca-Cola Company, Atlanta, GA (US); BOARD OF TRUSTEES OF MICHIGAN STATE UNIVERSITY, East Lansing, MI (US)

(72) Inventors: Shantanu Kelkar, East Lansing, MI (US); Thomas J. Pinnavaia, East Lansing, MI (US); Christopher M. Saffron, Okemos, MI (US); Robert Kriegel, Decatur, GA (US)

(73) Assignees: The Coca-Cola Company, Atlanta, GA (US); Board of Trustees of Michigan State University, East Landsing, MI (US)

( * ) Notice: Subject to any disclaimer, the term of this patent is extended or adjusted under 35 U.S.C. 154(b) by 136 days.

(21) Appl. No.: 14/776,114

(22) PCT Filed: Mar. 18, 2014

(86) PCT No.: PCT/US2014/031115
§ 371 (c)(1),
(2) Date: Sep. 14, 2015

(87) PCT Pub. No.: WO2014/146128
PCT Pub. Date: Sep. 18, 2014

(65) Prior Publication Data
US 2016/0030931 A1 Feb. 4, 2016

Related U.S. Application Data

(60) Provisional application No. 61/798,598, filed on Mar. 15, 2013.

(51) Int. Cl.
| | |
|---|---|
| *B01J 29/06* | (2006.01) |
| *B01J 29/04* | (2006.01) |
| *B01J 29/40* | (2006.01) |
| *C01B 39/36* | (2006.01) |
| *B01J 35/10* | (2006.01) |
| *B01J 37/30* | (2006.01) |
| *B01J 37/02* | (2006.01) |
| *B01J 37/00* | (2006.01) |
| *C10G 45/68* | (2006.01) |
| *C10G 3/00* | (2006.01) |
| *B01J 29/87* | (2006.01) |
| *C01B 39/02* | (2006.01) |
| *C01B 39/26* | (2006.01) |
| *C01B 39/38* | (2006.01) |
| *C01B 39/40* | (2006.01) |
| *B01J 37/08* | (2006.01) |
| *C10G 50/00* | (2006.01) |

(52) U.S. Cl.
CPC ........... *B01J 29/405* (2013.01); *B01J 29/041* (2013.01); *B01J 29/042* (2013.01); *B01J 29/045* (2013.01); *B01J 29/40* (2013.01); *B01J 29/87* (2013.01); *B01J 35/109* (2013.01); *B01J 35/1057* (2013.01); *B01J 37/0018* (2013.01); *B01J 37/0201* (2013.01); *B01J 37/08* (2013.01); *B01J 37/30* (2013.01); *C01B 39/02* (2013.01); *C01B 39/26* (2013.01); *C01B 39/265* (2013.01); *C01B 39/36* (2013.01); *C01B 39/38* (2013.01); *C01B 39/40* (2013.01); *C10G 3/49* (2013.01); *C10G 45/68* (2013.01); *C10G 50/00* (2013.01); *B01J 35/108* (2013.01); *B01J 35/1019* (2013.01); *B01J 35/1023* (2013.01); *B01J 35/1038* (2013.01); *B01J 35/1042* (2013.01); *B01J 35/1061* (2013.01); *B01J 2229/183* (2013.01); *B01J 2229/186* (2013.01); *B01J 2229/42* (2013.01); *C01P 2006/12* (2013.01); *C01P 2006/14* (2013.01); *C01P 2006/16* (2013.01); *C01P 2006/17* (2013.01); *C10G 2300/1014* (2013.01); *C10G 2400/30* (2013.01); *Y02P 30/20* (2015.11)

(58) Field of Classification Search
CPC . B01J 29/041; B01J 29/87; B01J 29/40; B01J 29/405; B01J 2229/186; B01J 37/08; B01J 37/30; B01J 37/0018; B01J 37/0201; B01J 35/1019; B01J 35/1023; B01J 35/1038; B01J 35/1042; B01J 35/1061; B01J 35/108; B01J 35/1057; B01J 35/109; C01B 39/02; C01B 39/36; C01B 39/38; C01B 39/40
USPC .............................................. 502/61, 73, 77
See application file for complete search history.

(56) References Cited

U.S. PATENT DOCUMENTS

| | | | | |
|---|---|---|---|---|
| 5,149,679 A | * | 9/1992 | Price ......................... | B01J 29/40 502/61 |
| 7,879,311 B2 | * | 2/2011 | Pinnavaia .............. | B01J 29/084 423/702 |

(Continued)

OTHER PUBLICATIONS

International Search Report for PCT/US2014/31115, dated Aug. 15, 2014.

*Primary Examiner* — Elizabeth D Wood
(74) *Attorney, Agent, or Firm* — King & Spalding

(57) ABSTRACT

The invention relates to a novel zeolite catalysts, methods of producing the zeolite catalysts and a methods of using such catalyst, including for production of BTEX with improved yield, product selectivity and reduced char production. The present invention relates to novel mesoporous zeolite catalysts, as well as methods of producing the same. The present invention also relates to methods of producing renewable aromatic hydrocarbons using such catalysts.

5 Claims, 2 Drawing Sheets

(56) References Cited

U.S. PATENT DOCUMENTS

| | | | |
|---|---|---|---|
| 2001/0024635 A1* | 9/2001 | Beck | B01J 29/04 |
| | | | 423/700 |
| 2002/0034471 A1* | 3/2002 | Jacobsen | B01J 29/0308 |
| | | | 423/700 |
| 2002/0131930 A1* | 9/2002 | Pinnavaia | B01J 29/0308 |
| | | | 423/702 |
| 2003/0095908 A1 | 5/2003 | Pinnavaia et al. | |
| 2005/0239634 A1* | 10/2005 | Ying | B01J 20/18 |
| | | | 502/64 |
| 2007/0258884 A1* | 11/2007 | Pinnavaia | B01J 29/084 |
| | | | 423/700 |
| 2008/0214882 A1* | 9/2008 | Pinnavaia | B01J 29/005 |
| | | | 585/653 |
| 2011/0313070 A1 | 12/2011 | Eling et al. | |
| 2013/0060070 A1 | 3/2013 | Huber et al. | |

* cited by examiner

MESOPOROUS MFI-ZEOLITE CATALYSTS, METHODS OF PREPARING THE SAME AND USES

CROSS REFERENCE TO RELATED APPLICATIONS

This application is a national phase application under 35 U.S.C. § 371 of International Application No. PCT/US2014/031115, filed on 18 Mar. 2014, which claims the benefit of U.S. Provisional Application No. 61/798,598, filed on Mar. 15, 2013, the disclosures of both of which are incorporated herein by reference.

FIELD OF THE ART

The present invention relates to novel mesoporous zeolite catalysts, as well as methods of producing the same. The present invention also relates to methods of producing renewable aromatic hydrocarbons using such catalysts.

BACKGROUND

Biomass fast pyrolysis involves the rapid heating of biomass in an inert atmosphere to produce bio-oil, a complex chemical mixture with a variety of commercial applications, including production of renewable materials from aromatic hydrocarbons.

Fast pyrolysis is often accompanied by catalytic upgrading of pyrolysis products (including bio-oil and vapors), which provides a highly deoxygenated product stream consisting mainly of hydrocarbons.

A variety of heterogeneous catalysts have been used or proposed for use in catalytic upgrading of the pyrolysis product stream, including synthetic zeolites. Synthetic zeolites are crystalline aluminosilicates, having the main formula $M_2/nO.Al_2O_3.xSiO_2.yH_2O$. Their building blocks are $SiO_4$ and Al tetrahedra linked at their corners by a common oxygen atom to provide an inorganic macromolecule with a unique three dimensional framework. Synthetic zeolites are typically classified by pore size as either microporous (pore diameter of less than about 2 nm) or mesoporous (pores diameter ranging from about 2 nm to about 50 nm).

Among the synthetic zeolites proposed for use in catalytic upgrading is Zeolite Socony Mobil-5 ("ZSM-5"). ZSM-5 was first prepared in 1975 and is still in widespread use in the petroleum industry for interconversion of hydrocarbons. It is a microporous Mordenite framework inverted structure (MFI) zeolite with a median pore size of about 0.55 nm. While ZSM-5 has demonstrated good aromatic yields in catalytic upgrading of the pyrolysis products, many intermediate and primary products of pyrolysis remain unreacted given pore sizes.

Other synthetic zeolite catalysts have been proposed for use in catalyatic vapor upgrading, including catalysts with larger pores or mesoprous characteristics, but have generally proven inferior.

For example, mesoporous zeolite catalysts (e.g., Al-MCM-41, Al-MSU-S and alumina stabilized Ceria) have been proposed, but their pore sizes have proven too large or they've lacked the shape selectivity or acidity of ZSM-5. They are also less hydrothermally stable than ZSM-5.

Hydrothermally stable mesoporous aluminosilicates prepared from zeolite seeds (known as MSU-S) have also been proposed. Yet, MSU-S have shown low selectivity for aromatics production compared to ZSM-5.

Accordingly, there remains a need for new catalysts for use catalytic upgrading of biomass pyrolysis products and more particularly, catalysts that exhibit (i) high selectivity toward particular aromatics, such as C6-C9 monoaromatics, particularly p-xylene, (ii) high reaction rates and (iiii) low rates of deactivation, e.g., by char production.

In addition, there remains a need for improved processes for preparing BTEX (an acronym that stands for benzene, toluene, ethylbenzene, and xylenes) from isobutylene derived from various biologically derived feedstocks.

SUMMARY

The present invention provides novel mesoporous zeolite catalysts, as well as methods of preparing the same. The present invention also includes methods using such catalysts in the production of renewable aromatic hydrocarbons.

In one aspect, the present invention is a mesoporous zeolite catalyst having a Mordenite framework inverted structure (MFI) and an average intracrystal mesopore size of in the range from about 2.0 to about 5.0 nm, a pore size distribution in the range from about 1.0 to about 1.5 nm width at half maximum height, a BET surface area in the range from about 350 to about 700 $m^2/g$, an average pore volume (as determined by BJH pore volume analysis) in the range from about 0.1 to about 1.0 $cm^3/g$, and/or an average micropore volume in the range from about 0.05 to about 0.2 $cm^3/g$. In a further embodiment, the mesoporous zeolite catalyst includes dehydrogenating metal, e.g., Ga, in an amount from 0.1 to 4 mol % relative to aluminum content.

In one embodiment, the mesoporous zeolite catalyst further comprises a dehydrogenating metal, i.e., is a metal-loaded mesoporous zeolite catalyst.

In a particular embodiment, the dehydrogenating metal is selected from gallium (Ga), copper (Cu), Zinc (Zn), molybdenum (Mo), bismuth (Bi), platinum (Pt), aluminum (Al), oxides, carbides and combinations thereof. In a preferred embodiment, the dehydrogenating metal is Ga.

In a particular embodiment, the metal loading is in the range of about 0.05 to about 5 mol % relative to aluminum, e.g. about 0.1 to about 4 mol %, 0.2 to about 3 mol %, 0.3 to about 2 mol %, and including all values encompassed therein.

In another aspect, the present invention is a method of preparing the mesoporous zeolite catalyst of the present invention comprising i) providing a mesoporogen, ii) admixing the mesoporogen and a zeolite synthesis gel to provide a mixture; (iii) crystallizing the mixture, iii) calcining the crystallized material and optionally, iv) protonating the obtained zeolites, to produce a mesoporous zeolite catalyst In one embodiment, the mesoporogen is a silane functionalized polymer, e.g., prepared by reacting a polyetheramine, polyethylenimine, or combination thereof, with a silylating reagent.

In a particular embodiment, the method further comprises impregnating protonated zeolites with a dehydrogenating metal, e.g., by the incipient wetness method, which comprises the steps of a) dissolving a dehydrogenating metal precursor in an aqueous or organic solution, b) obtaining protonated zeolites, c) applying the solution to the protonated zeolites and then d) calcining the zeolites to obtain metal-loaded mesoporous zeolite catalysts. Preferably, the volume of solution applied is comparable to the total pore volume of the zeolites being impregnated, the solution is thereby drawn into the pores by capillary action.

In a further aspect, the present invention is a method for fast pyrolysis, comprising contacting a biomass feedstock with the mesoporous zeolite catalyst of the present invention to produce one or more pyrolysis products. In one embodiment, the pyrolysis product is bio-oil.

In another embodiment, the pyrolysis product is vapor.

In one embodiment, the feedstock is a lignocellulosic feedstock.

In another aspect, the present invention is a method for upgrading a pyrolysis product, comprising contacting the pyrolysis product with the mesoporous zeolite catalyst of the present invention to produce an upgraded composition.

In one embodiment, the pyrolysis product is bio-oil.

In another embodiment, the pyrolysis product is vapor.

In one embodiment, the upgraded composition is deoxygenated and enriched in aromatics and olefins relative to the pyrolysis product.

In a particular embodiment, the upgraded composition is bio-oil deoxygenated and enriched in aromatics and olefins.

In another embodiment, the method produces a higher proportion of vapors (condensable and non-condensable) than the same method using a ZSM-5 catalyst.

In a particular embodiment, the method provides a higher yield of aromatics, than the same method performed using a ZSM5 catalyst. In a particular embodiment, the yield is improved by an amount greater than about 5%, greater than about 20% or greater than about 25%.

In another particular embodiment, the method produces less solid product (char and coke) than the same method performed using a ZSM-5 catalyst.

In yet another particular embodiment, the method produces a higher proportion of vapors (condensable and non-condensable) than the same method using a ZSM-5 catalyst.

In a further aspect, the present invention is a method of producing BTEX, comprising (i) fast pyrolysis of a biomass feedstock to produce one or more pyrolysis products; (ii) catalytic upgrading of the pyrolysis products to produce upgraded bio-oil; and (iii) chemical treatment of the upgraded bio-oil to produce BTEX, wherein step (ii) is catalyzed by the mesoporous zeolite catalyst of the present invention.

In one embodiment, step (i) is also catalyzed by the mesoporous zeolite catalyst of the present invention.

In certain embodiments, BTEX prepared from fast pyrolysis of a lignocellulosic feedstock is used to prepare terephthalic acid.

DETAILED DESCRIPTION

Figure 1:
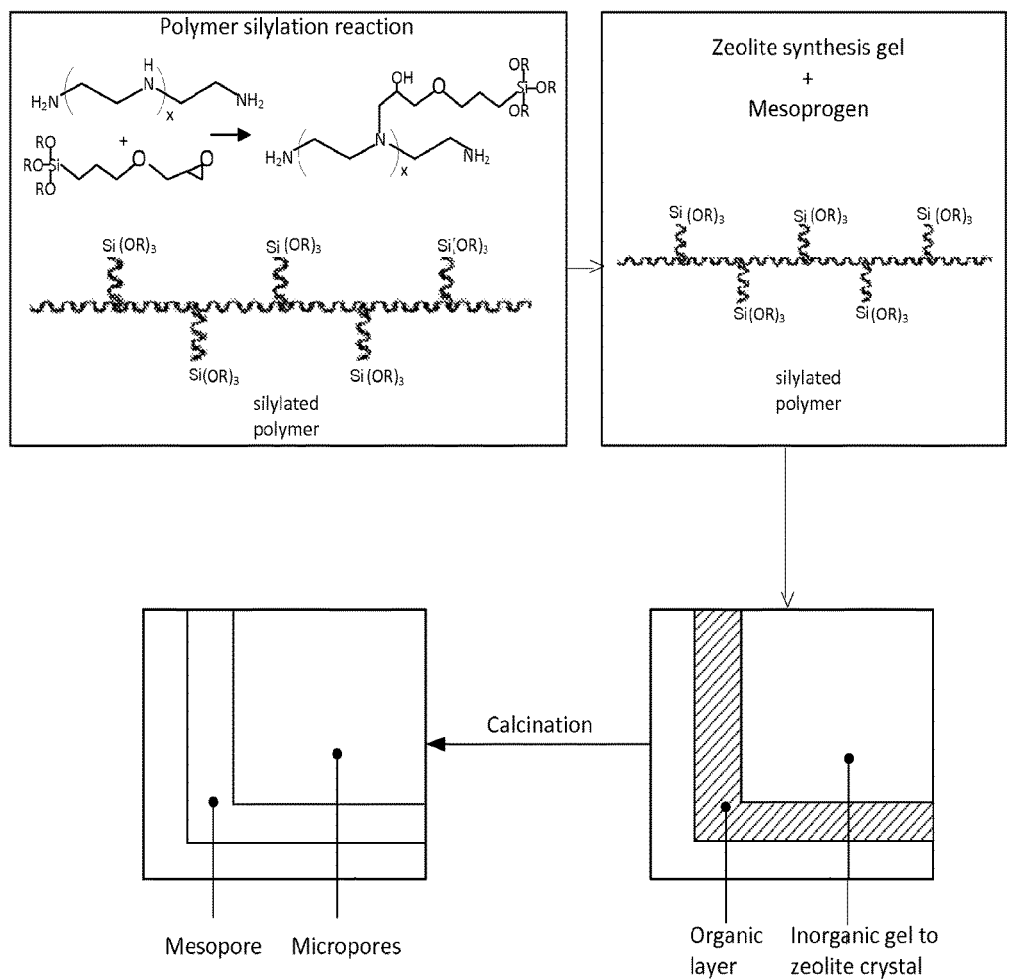
FIG. 1 Schematic illustrating the general method of producing the mesoporous zeolite catalysts of the present invention.

The present invention provides novel mesoporous zeolite catalysts, as well as methods of preparing the same. The present invention also includes novel methods for the use of such catalysts, including the production of renewable aromatic hydrocarbons, such as BTEX.

Zeolite Catalysts

The present invention provides novel mesoporous zeolite catalysts.

In one embodiment, the novel mesoporous zeolite crystal is a MFI-type zeolite with uniform intra-crystal as well as inter-crystal mesopores. The zeolite is a templated zeolite with small intracrystal mesopores (average pore size from about 2.0 to about 5.0 nm) and narrow pore size distributions (ca. about 1.0 to about 1.5 nm width at half maximum). In a particular embodiment, the a BET surface area is in the range from about 350 to about 700 $m^2/g$, an average pore volume (as determined by BJH pore volume analysis) is in the range from about 0.1 to about 1.0 $cm^3/g$, and/or an average micropore volume is in the range from about 0.05 to about 0.2 $cm^3/g$. Typically, the zeolite has a $Si:Al_2O_3$ molar ratio of at least about 5, wherein the silica:alumina molar ratio is suitably in the range of about 6:1 to about 90:1, such as, for example, about 10:1 to about to about 40:1.

The mesoporous zeolite catalyst may further include an amount of a dehydrogenating metal capable of promoting olefin production. The metal is incorporated in the zeolite structure. The zeolite doped with a dehydrogenating metal exhibits increased catalyst acidity, selectivity for aromatics and reduced char and coke production compared to the non-metal doped MFI catalyst.

In preferred embodiments, the dehydrogenating metal is selected from gallium (Ga), copper (Cu), Zinc (Zn), molybdenum (Mo), bismuth (Bi), platinum (Pt), aluminum (Al), oxides, carbides and combinations thereof. A preferred dehydrogenating metal is Ga.

Suitably, the metal loading may be in the range of about 0.05 to about 5 mol % relative to aluminum for example, from about 0.1 to about 4 mol %, such as about 0.2 to about 3.5 mol %, or about 0.2 mol %, about 0.5 mol %, about 1 mol %, about 2 mol %, or about 3 mol % and any range there between. The metal loading on a zeolite is expressed in terms of the fractional loading of the metal as gram atoms of metal per gram atom of aluminum in the zeolite. The metal loading can also be expressed as a mole percentage loading relative to aluminum in the zeolite through the relationship: mol % Metal=(gram atoms Metal/gram atoms aluminum)× 100. Thus, for example, a loading of 0.005 gram atoms of gallium per aluminum in the zeolite equates to a 0.5 mol % loading of gallium relative to aluminum in the zeolite.

Catalyst Compositions

In one aspect, the present invention is a composition comprising the novel mesoporous zeolite crystal.

The zeolite may be used in the form of powders, including powders consisting wholly or in part of single crystals, or the zeolite crystals may instead be incorporated in shaped agglomerates, for example, tablets, extrudates or spheres, which may be obtained by combining the zeolite with a binder material that is substantially inert under the conditions employed in the oligomerization process.

The zeolite catalyst may be present in amount from about 1 to about 99% by weight, based on the combined weight of the zeolite and binder material. As binder material, any suitable material may be used, for example, silica, metal oxides, or clays, such as montmorillonite, bentonite and kaolin clays, the clays optionally being calcined or modified chemically prior to use. Further examples of suitable matrix materials include silica-alumina, silica-berylia, silica-magnesia, silica-thoria, silica-titania, silica-alumina-magnesia, silica-alumina-thoria, silica-alumina-zirconia and silica-magnesia-zirconia.

Methods of Preparing

In another aspect, the present invention is a method of preparing the novel mesoporous zeolite catalyst or a composition comprising the same.

In one embodiment, the present invention is a method of preparing a zeolite catalyst comprising the steps of i) preparing or obtaining a mesoporogen, ii) crystallizing a mixture of a mesoporogen and a zeolite synthesis gel, iii) calcining the crystallized material and optionally, iv) protonating the obtained zeolites.

"Mesoporogens," are silane-functionalized polymers which have an organosilane or organosiloxane group covalently attached to a polymer, e.g., a polymer bearing $NH_2$ groups. The term organosilane as used herein encompasses organosiloxane functional groups as well. The organosilane functional groups allow the polymer to be incorporated in the zeolite synthesis gel prior to crystallization. The organosilane or organosiloxane functional groups are not particularly limited and may be selected from any among those known in the art, for example —Si(OR)$_3$, or —SiR$_3$ groups wherein the R groups may be the same or different.

The polymer to be silane functionalized may be a polyetheramine, or polyethylenimine. Preferably, the polymer to be silane functionalized has a molecular weight in the range from 200 to 25,000 Da, e.g., 230, 300, 430, 2,000, 4,000, 10,000, 15,000, 20,000 and any range therebetween. In one example, the polyetheramine is an amine terminated polypropylene glycol (PPG), e.g., selected from a Jeffamine® D series polymer, i.e., a diamine polyetheramine, such as those described below.

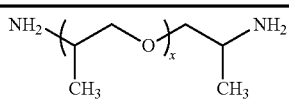

| JEFFAMINE ® | x | MW* |
|---|---|---|
| D-230 | ~2.5 | 230 |
| D-400 | ~6.1 | 430 |
| D-2000 | ~33 | 2,000 |
| D-4000 (XTJ-510) | ~68 | 4,000 |

The method for obtaining silane-functionalized polymers is not particularly limited and the reagents and procedures are well known by those of ordinary skill in the art. In one example, the silane-functionalized polymers may be formed by reaction of all of N—H groups of a polymer (e.g., a polypropylene oxide diamine polymer) with a silylating reagent known in the art to form N—Si linkages to the alkyl silane units.

A zeolite synthesis gel is known to those of ordinary skill in the art. In one example, the zeolite synthesis gel is formed by preparing a solution of 1.0 M tetrapolyammonium hydroxide solution (TPAOH) and then adding the solution to a mixture of tetraethoxysilane (TEOS) and aluminum isopropoxide under vigorous stirring, to obtain a gel with the molar composition of approximately 1 $SiO_2$: 0.012 $Al_2O_3$: 0.37 TPAOH: 20 $H_2O$: 4 EtOH: 0.10. The method of producing a zeolite syntheses gel is selected from among those known in the art so as to produce a zeolite having the silica:alumina molar ratio is suitably in the range of about 6:1 to about 90:1, such as, for example, about 10:1 to about 40:1

The mesogen is combined with the zeolite synthesis gel at a concentration of from 01 to 0.2 mg polymer/ml volume of solution, preferably, 0.025 to 0.1 mg/ml.

Typically, the crystallizing step involves a reaction temperature in the range of about 100° C. to about 150° C. In one example, the molecular weight of the polymer prior to silylation is in the range from about 3,500 to about 4,500, e.g., about 4,000, and the crystallization temperature is about 100° C. In another example, the molecular weight of the polymer prior to silylation is in the range from about 400 to about 600, e.g., about 440 and the crystallization reaction temperature is between about 120 and about 150° C. Typically, the heating is for a period from 0.5 hours to 24 hours.

In one example, the calcination step comprises increasing the temperature of air from ambient to about 600° C. (i.e., in the range of about 500 to about 700° C., e.g., about 550° C., about 595° C., about 605° C., about 550° C.) over a period of 3 to 5 hours, preferably 4 hours. In an second example, the calcination step comprises a first heating step under a nitrogen atmosphere at about 400° C. (i.e., in the range of about 350 to about 450° C., e.g., about 375° C., about 395° C., about 405° C., about 450° C.) for a period of about 4 hours followed by a second heating step under air to about 600° C. (i.e., in the range of about 500 to about 700° C., e.g., about 550° C., about 595° C., about 605° C., about 550° C.) over a period of about 3 to about 5 hours, preferably about 4 hours. Preferably, the calcination step removes the mesoporogen from the zeolite pores.

Optionally, the obtained zeolite is protonated by methods well known in the art. For example, by treatment with ammonium nitrate solution or by refluxing in a dilute HCl solution, e.g., 20%-5% preferably 10% HCl. The zeolite may be fully protonated, i.e. substantially all acid sites are in proton form or they may be partially protonated. A mixture of fully protonated and partially protonated catalysts may be used.

Metal-loaded mesoporous zeolite catalysts according to the present invention are prepared by any suitable method. In one embodiment, the metal-loaded mesoporous zeolite catalysts is prepared by impregnating zeolites with a dehydrogenating metal by the incipient wetness method, which comprises the steps of a) dissolving a dehydrogenating metal precursor in an aqueous or organic solution, b) obtaining zeolites, c) applying the solution to the zeolites and then d) calcining the zeolites to obtain metal-loaded mesoporous zeolite catalysts. Preferably, the volume of solution applied is comparable to the total pore volume of the zeolites being impregnated, the solution is thereby drawn into the pores by capillary action. Optionally, the zeolites to be impregnated are first protonated, as discussed above.

Methods of Use

The present invention includes methods of using the novel mesoporous catalysts. The catalysts of the present invention are may be used, for example, in methods of fast pyrolysis and methods of upgrading (nascent) pyrolysis products. These catalysts may also be used in methods of making BTEX, paraxylene or terepthalic acid, involving fast pyrolysis and/or catalytic upgrading steps.

In one embodiment, the present invention is a method of fast pyrolysis comprising contacting a biomass feedstock with the mesopourous catalyst of the present invention to provide one or more pyrolysis products.

In one embodiment, the pyrolysis product is a bio-oil.

In another embodiment, the pyrolysis product is vapor.

In one embodiment, the feedstock is a lignocellulosic feedstock.

In another aspect, the present invention is a method for upgrading a nascent pyrolysis product, comprising (i) providing one or more nascent pyrolysis products and (ii) contacting the nascent pyrolysis product with the mesoporous zeolite catalyst to produce an upgraded composition.

In one embodiment, the nascent pyrolysis product is bio-oil.

In another embodiment, the nascent pyrolysis product is vapor.

In one embodiment, the upgraded composition is deoxygenated and enriched in aromatics and olefins relative to the nascent pyrolysis product.

In a particular embodiment, the upgraded composition is bio-oil deoxygenated and enriched in aromatics and olefins compared to the nascent pyrolysis product.

The catalysts of the present invention advantageous improve yields in fast pyrolysis and/or catalytic upgrading.

In another embodiment, the method produces a higher proportion of vapors (condensable and non-condensable) than the same method using a ZSM-5 catalyst.

In a particular embodiment, the method provides a higher yield of aromatics, than the same method performed using a ZSM5 catalyst. In a particular embodiment, the yield is improved by an amount greater than about 5%, greater than about 20% or greater than about 25%.

In another particular embodiment, the method produces less solid product (char and coke) than the same method performed using a ZSM-5 catalyst.

In yet another particular embodiment, the method produces a higher proportion of vapors (condensable and non-condensable) than the same method using a ZSM-5 catalyst.

In a further aspect, the present invention is a method of producing BTEX, comprising (i) fast pyrolysis of a biomass feedstock to produce one or more pyrolysis products; (ii) catalytic upgrading of the pyrolysis products to produce upgraded bio-oil; and (iii) chemical treatment of the upgraded bio-oil to produce BTEX, wherein step (ii) is catalyzed by the mesoporous zeolite catalyst of the present invention.

In a particular embodiment of the method, step (i) is also catalyzed by the meosporous zeolite catalyst.

In one embodiment, the present invention is a method for converting biomass into renewable terephthalic acid is provided comprising the steps of i) converting a biomass feestock into one or more pyrolysis products by means of fast pyrolysis, ii) either simultaneously or subsequently contacting the pyrolysis product with a mesoporous zeolite catalyst thereby generating an upgraded composition deoxygenated and enriched in aromatic hydrocarbons relative to the pyrolysis product, iii) isolating BTEX from the product stream, iv) isomerizing BTEX to para-xylene and then v) oxidizing the para-xylene to produce terephthalic acid.

In a particular embodiment, the step of contacting the pyrolysis product with a mesoporous zeolite catalyst occurs at an elevated temperature, e.g., in the range between about 400° C. and about 750° C., preferably about 650° C.

In a particular embodiment, the aromatic hydrocarbons are C6-C9 monoaromatics.

In another embodiment, the aromatic hydrocarbons are BTEX.

A process of upgrading a fast pyrolysis product stream comprising contacting the mesoporous zeolite catalyst of the present invention with the fast pyrolysis product stream. In a particular embodiment, the temperature is elevated, e.g., in the range between about 400° C. and about 750° C., preferably about 650° C.

A process of producing BTEX is provided using the disclosed mesoporous zeolites comprising the steps of contacting an isobutylene-containing feedstock stream with a mesoporous zeolite catalyst thereby generating a product stream enriched in BTEX, and isolating BTEX from the product stream. In certain embodiments, the, isobutylene-containing feedstocks are generated by fast pyrolysis of biomaterials, such as lignocellulosic materials. In particular embodiments, the step of contacting the mesoporous zeolite catalyst with the pyrolysis product stream is at elevated temperatures, e.g., in the range between about 400° C. and about 750° C., preferably about 650° C. Typically, the mesoporous zeolite catalyst as described herein or used in any of the methods disclosed herein has an improved aromatic selectivity for C6 (benzene) and C7 (toluene) aromatics compared to ZSM5 catalysts. In further embodiments, the zeolite catalyst has an improved selectivity towards C8 (e.g., p-xylene) and C9 monoaromatics. Aromatic selectivity is defined as the moles of carbon in an aromatic group divided by the total amount of carbon in the condensable product.

Typically, use of the mesoporous zeolite catalyst as described herein results in an improved production of pyrolysis vapors. In particular embodiments, the percent production of pyrolysis vapors is greater than about 50%, about 54% or greater, about 55% or greater, about 56% or greater, about 57% or greater, about 58% or greater, about 59% or greater, about 60% or greater or any range between any of these amounts.

This improvement in producing pyrolysis vapors is related to a decrease in the amount of char, tar and coke production. In particular embodiments, the char, tar and coke production is 50% or less, about 46% or less, about 45% or less, about 44% or less, about 43% or less, about 42% or less, about 41% or less, about 40% or less or any range between any of these amounts, compared to the same method using a ZSM-5 catalyst.

Typically, use of the novel mesoporous zeolite catalyst described herein results in an improved aromatic yield compared to ZSM-5 catalysts. In particular embodiments, the aromatic yield is greater than about 0.65%, greater than about 0.70%, greater that about 0.75%, greater than about 0.85%, greater than about 0.90%, greater than about 1.00%, greater than about 1.05%, greater than about 1.1%, greater than about 1.15%, greater than about 1.2% or any range between any of these amounts, compared to the same method using a ZSM-5 catalyst.

In particular embodiments, Ga-doped zeolite catalysts provide BTEX yields improved by an amount greater than 5% compared to non-Ga doped catalysts, such as, for example, greater than about 10%, about 15%, about 20%, or about 25% or more, compared to the same method using a ZSM-5 catalyst.

In other particular embodiments, coke production is reduced by the use of Ga-doped zeolite catalysts by an amount greater than 2% compared to non-Ga-doped zeolite catalysts, such as, for example, greater than about 3%, about 4%, about 5%, about 6%, about 10% or about 15%, compared to the same method using a ZSM-5 catalyst, Typically, biomass feedstocks for any of the processes disclosed herein, may be a lignocellulosic feedstock. Lignocellulosic feedstocks suitable for process are not particularly limited and include renewable biomass sources of lignocellulosic feedstocks such as paper, yard, agricultural, municipal solid waste and forest and sawmill residues. Lignin streams obtained from pretreatment, fractionation or after fermentation of lignocellulosic feedstocks are also suitable for catalytic pyrolysis with the zeolite catalyst. Additional examples include black liquor obtained from Kraft mills, the base extraction of biomass to remove lignin from the carbohydrate fraction. Also, pretreatment technologies such as ammonia fiber expansion, sodium hydroxide extraction, and the use of alkaline hydrogen peroxide can be operated in such a manner as to collect lignin. The whole broth product of fermentation (ethanol, butanol, isobutanol etc.) also contains lignin-derived compounds. Typically, this material is dried and combusted for heat and power. In particular embodiments, the feedstock can be plant waste, trees and grasses, crop waste, and discarded/dropped seasonal biomass and farmed energy crops.

In one embodiment, the present invention is a method for producing BTEX, where BTEX is useful for producing renewable terephthalic acid ded. Typically, the BTEX produced by the methods of the present invention is isomerized to para-xylene according to known isomerization technology commercially used today. The para-xylene is then oxidized using known commercially available processes to produce polyester grade terephthalic acid.

In another embodiment, the present invention is a method for producing para-xylene, comprising contacting a biomass feedstock with the catalyst of the present invention under conditions suitable to produce BTEX and isolating and converting BTEX into para-xylene.

In yet another embodiment, the present invention is a method for producing polyester grade terephthalic acid, comprising contacting a biomass feedstock with the catalyst of the present invention under conditions suitable to produce BTEX, isolating and converting BTEX into para-xylene and oxiding para-xylene to produce polyester grade terepthalic acid.

In a further embodiment, a process for the production of renewable PET is provided comprising condensing terephthalic acid derived from the process described herein with petroleum-derived ethylene glycol, biomass-derived ethylene glycol or a combination therof. In a particular embodiment, PET is prepared by condensing terephthalic acid prepared by the process described herein with ethylene glycol derived from biomass (partially or entirely). Methods for obtaining ethylene glycol from biomass and methods of preparing PET therefrom are provided in U.S. Ser. No. 12/210,208 and U.S. Ser. No. 12/577,480, the contents of which are incorporated herein in their entirety.

Applications for renewable PET are not particularly limited and include applications in the beverage field, e.g., any sectors whether commerce or non-commerce relating to beverages of any kind (including beverage packaging), with non-limiting examples including sectors engaged in the production, sale and/or distribution of any beverage and liquids, gels, powders, jelly, or the like that are meant to be ingested by humans such as but not limited to carbonated and non-carbonated soft drinks, isotonics, flavored and unflavored packaged waters for drinking, fruit and vegetable juices and drinks, drinks containing juices, teas, coffees, chocolate drinks, waters, non-alcoholic malt beverages, alcoholic beverages, yogurts, smoothies, dairy containing drinks, energy drinks, organic beverages, beverages of a similar nature to the foregoing.

Applications for renewable PET also include applications in various non beverage sectors including: food packaging, e.g., trays, plates, containers (salad dressings, cooking oil, peanut butter, frozen foods); industrial applications, e.g. liners, films, bags, sheeting, tubing, packaging, pallet covers, shipping containers, solar cells, thermal insulation; home, e.g., bath/shower furnishings, siding, windows, appliances, housewares, storage bins, sinks, luggage, lawn/garden equipment, wall panels; auto, e.g., dashboard, truck bed liners, bumpers, fascias, instrument panels, fenders, interior parts; healthcare packaging, e.g., blister packs, clamshells, containers (shampoo, liquid hand soap, mouthwash) pharmaceuticals; aircraft, e.g., interior parts, windows, storage bins, bathroom products; Signage/lighting, e.g., internal and external; sport/recreation, e.g., fitness and other sport equipment such as treadmills, bikes, kayaks; agricultural equipment, e.g., cowlings, fenders and dashboard parts, lawn/garden, e.g., external parts on mowers, etc.; construction equipment, e.g., engine covers, cab interiors, etc.

The following examples are presented for illustrative purposes only, and are not intended to be limiting.

EXAMPLES

Example 1

Synthesis of MFI-Type Zeolites M1 Through M6

Figure 2:
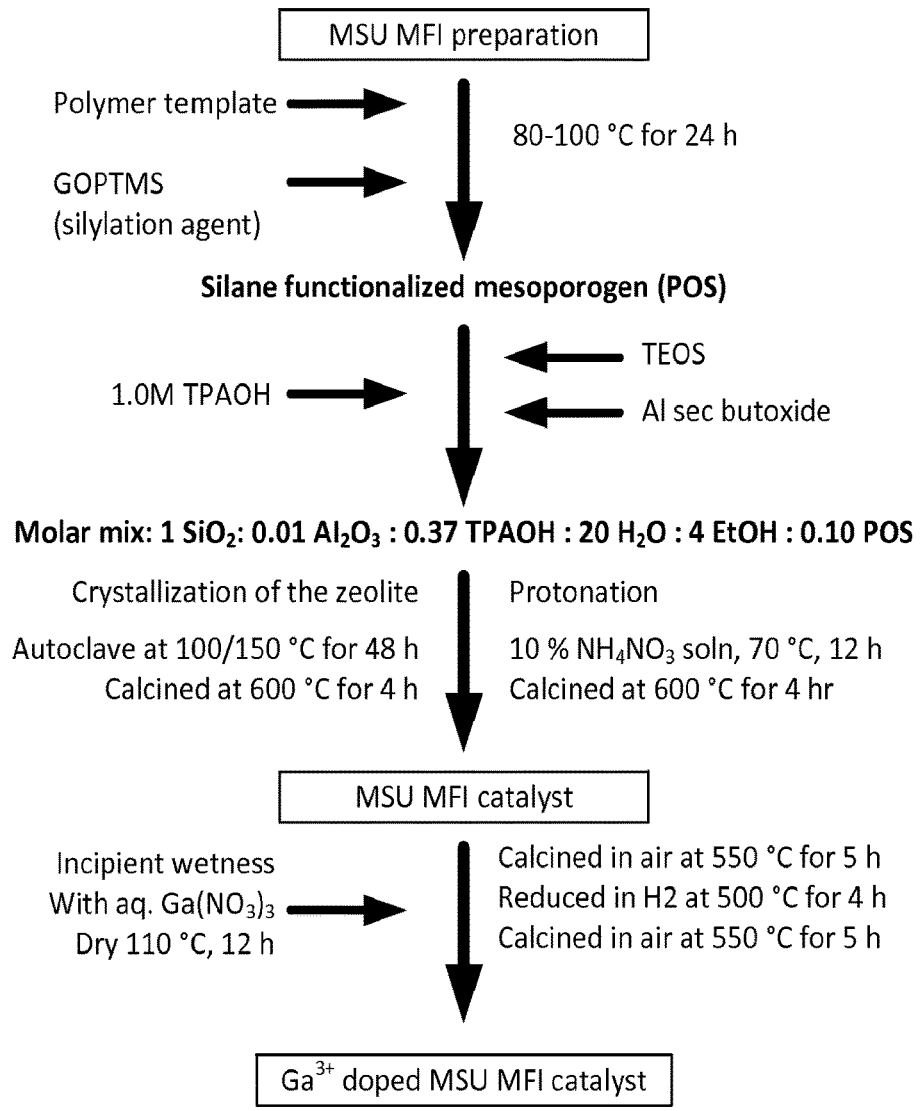
FIG. 2 Schematic illustrating a specific method of producing the mesopourous zeolite catalysts of the present invention.

The process for producing a mesoporous MFI zeolite catalyst is depicted in FIG. 2. MFI catalysts with different porosities were synthesized by varying reaction conditions as illustrated in Table 1. Organic polymers of polypropylene oxide $\alpha,\omega$-diamine (Jeffamine D-400 and Jeffamine D-4000, Huntsman) with molecular weights of 400 and 4,000 Daltons, respectively, were used as mesopore generators.

The silylated polymers M1 through M6 were formed by reaction of all of the N—H groups of Jeffamine D-series polymer with glycidoxypropyltrimethoxysilane (GOPTMS, Sigma) to form N—Si linkages to the GOPTMS units. The silylation reactions were carried out in ethanol solution at 80-85° C. in sealed pressure tubes for a period of 24 h. The ethanol was removed under vacuum at room temperature and the silylated mesoporogen was stored under $N_2$ in sealed bottles. A solution of the mesoporogen in 1.0 M tetrapolyammonium hydroxide solution (TPAOH) was added to a mixture of tetraethoxysilane (TEOS) and aluminum isopropoxide under vigorous stirring, to obtain a gel with the molar composition 1 $SiO_2$: 0.012 $Al_2O_3$: 0.37 TPAOH: 20 H2O: 4 EtOH: 0.10 to a concentration of polymeric organosilicon corresponding to the concentration identified in Table 1 below. The crystallization of the zeolite phase was carried out in a Teflon-lined autoclave at 100 to 150° C. for 48 to 96 hours under static conditions. The products were washed, air-dried, and calcined at 600° C. for 4 hours to remove the mesoporogen. Two different calcination methods were applied. In the first method, the catalyst was calcined under air increasing the temperature from ambient conditions to 600° C. for 4 h. In the second calcination treatment, the catalyst was subjected first to a nitrogen atmosphere at 400° C. for 4 h followed by a second calcination step under air at 600° C. for 4 h. Prior to use, the zeolites were converted to the protonated forms by treating the calcined zeolites with 10% ammonium nitrate solution at 80° C. for 12 hours, twice, and then the product was calcined in air at 600° C. for 4 hours. In another variation of this method, calcined zeolites may be refluxed in 10% HCl for 12 h and then washed thoroughly to remove any trace of chlorides, confirmed using silver nitrate solution.

The ZSM-5 zeolite catalysts and their preparation are described in U.S. Pat. No. 3,702,886, which is herein incorporated by reference.

| ID | Polymer | Conc. mg/mL | Temp. ° C. |
|---|---|---|---|
| M1 | D400 | 0.05 | 150 |
| M2 | D400 | 0.1 | 150 |
| M3 | D400 | 0.05 | 120 |
| M4 | D400 | 0.1 | 120 |
| M5 | D4000 | 0.025 | 100 |
| M6 | D4000 | 0.05 | 100 |
| ZSM5 | — | — | — |

Example 2

Characterization of MFI-Type Zeolites M1 Through M6

The MFI-type zeolites prepared in Example 2 were characterized for number and strength of active sites using BET surface area and BJH pore volume analysis. Surface area measurements and pore size distribution analysis were done by nitrogen adsorption at 195° C. (78 K) in a Micromeritics ASAP 2010 instrument. Prior to measurements, each sample was out-gassed in the degas port of the apparatus at 220° C. for 24 h. The surface area originating from the framework micropores of the zeolite was determined from t-plots of the nitrogen adsorption data. The XRD patterns were recorded on a Rigaku Rotaflex Diffractometer using CuKα radiation (λ=1.542 A°). The Ga, Si and Al content for catalysts was determined by inductively coupled plasma (ICP) analysis performed by Galbraith Laboratories (Knoxville, Tenn.). Ga presence was also confirmed using X-ray photoelectron spectroscopy. X-ray photoelectron spectroscopy was performed on a Perkin Elmer Phi 5400 ESCA system equipped with a Magnesium Kα x-ray source. Samples were analyzed at pressures between 10-9 and 10-8 torr with a pass energy of 58.7 eV and a take-off angle of 45°.

X-ray diffraction was used to compare the structure of zeolites crystals. The characteristic peaks for MFI catalysts are observed in both ZSM-5 and MFI1. No other crystalline phases were observed; therefore it was concluded that the catalyst produced was a mesoporous aluminosilicate with zeolite walls. The mesopores reduce the domain of zeolite crystals, therefore the peaks of MFI1 are of lower intensity. Note the increase in median pore size, mesoporosity and loss of microporosity upon use of larger D4000 as mesoporogen (M6).

| .ID | BET Surface Area ($m^2/g$) | Pore size (nm) | Pore Vol. ($cm^3/g$) | Micropore Vol. ($cm^3/g$) | Ext. surface area ($m^2/g$) |
|---|---|---|---|---|---|
| M1 | 514 | 2.6 | 0.47 | 0.084 | 327 |
| M2 | 520 | 2.9 | 0.65 | 0.059 | 455 |
| M3 | 480 | 2.9 | 0.63 | 0.063 | 404 |
| M4 | 523 | 2.9 | 0.66 | 0.062 | 385 |
| M5 | 476 | 3.8 | 0.44 | 0.064 | 370 |
| M6 | 569 | 3.9 | 0.58 | 0.063 | 481 |
| ZSM5 | 396 | 0.6 | 0.24 | 0.119 | 135 |

Example 3

Catalytic Pyrolysis of a Poplar Feedstock Using the Catalysts Prepared in Example 1

Experiments were conducted using a microscale pyrolysis unit, CDS Pyroprobe 5250 (CDS Analytical Inc, Oxford, Pa.) interfaced to a Shimadzu QP-5050A gas chromatograph/mass spectrometer (Shimadzu Corp, Columbia, Md.). A lignocellulosic feedstock poplar (DN-34, Populus× euramericana, cv. 'Eugenei') was used as biomass for all experiments. The poplar was dried at 60° C. to moisture content of about 8%, ground to a particle size of less than 0.5 mm and stored at room temperature. For biomass pyrolysis experiments, approximately 0.5 mg of ground biomass samples were packed between quartz wool in a quartz tube with a filler rod. For catalytic pyrolysis experiments, approximately 0.5 mg of biomass was packed between quartz wool. Catalyst, at a 10:1 weight ratio of catalyst to biomass, was added on both sides followed by more quartz wool to hold the sample in place. Six or more replicates of each sample were run. Pyrolysis proceeded by setting the pyroprobe at 650° C. with a hold time of 20 s at the maximum heating rate. The GC used a Restek rtx-1701 column (Restek, Bellefonte, Pa.), 60 m×0.25 mm with a 0.25 μm film thickness. The column gas flow was 1 cm/s with a split ratio of 1:100 so as to not overwhelm the mass spectrometer. The GC oven temperature program began with a 1 minute hold at 40° C. followed by heating at 8° C./min to 270° C. The injector and detector temperature was set at 280° C. Identification of compounds was performed by comparing the mass spectra of the peaks with standard spectra of other compounds using the NIST library to obtain the most probable matches. Pure compounds (Sigma-Aldrich Co., St Louis, Mo.) were then used to confirm the peak identities based on matching of retention times and mass spectra. Quantification was performed using external standards in acetonitrile and a four-point calibration curve was constructed relating concentration to peak area response. The mass spectra were recorded in electron ionization mode for m/z 28 to 300.

The products of fast pyrolysis of poplar with and without catalyst were analyzed using a GC/MS. Pyrolysis yielded a mixture of water, light gases such as carbon oxides, aldehydes, ketones, phenolics and anhydrosugars. Without being bound be theory, it is believed that catalysis of pyrolysis products involves the homogeneous reactions of thermal decomposition of biomass into smaller oxygenated molecules. The small molecules diffuse into the catalyst pores and react at the active sites through a series of cyclo-oligomerization, decarbonylation and dehydration reactions to produce light hydrocarbons, aromatics, CO, $CO_2$ and water.

Compounds detected with GC/MS chromatograms from poplar pyrolysis times are as follows: (retention time) compound name, (4.0) Gases, CO, CO2, (6.3) Glycolaldehyde, (7.1) acetic acid, (7.8) acetol, (8.1) 3-hydroxy-2-butanone, (9.9) acetic anhydride, (10.5) furfural, (11.2) 2-methyl-2-cyclopentenone, (12.1) cyclohexanone, (13.6) 3-methyl-1, 2-cyclopentanedione, (15.5) phenol, (16.1) guaiacol, (16.5) 2-methoxy-4-methylphenol, (18.5) 4-ethyl-2-methoxy phenol, (19.0) 2-methoxy-4-vinylphenol, (20.5) eugenol, (22.1) syringol, (23.6) 2-methoxy-4-(1-propenyl)-phenol, (23.8) 1,2,4-trimethoxybenzene, (26.0) 5-tert-Butylpyrogallol, (25.8) 4-vinylsyringol derivatitive, (27.4) levoglucosan, (2738) 2,6-dimethoxy-4-(2-propenyl)-phenol.

In contrast, compounds detected with GC/MS chromatograms from poplar pyrolysis catalyzed by catalyst M1, times are as follows: (3.6) Oxygen, (3.9) Carbon dioxide, (4.1) Formic acid, ethenyl ester, (4.2) Methanol, (4.5) Ethanol, (4.7) Acetone, (6.0) Benzene, (7.1) Acetic acid, (7.8) Toluene, (9.8) Ethylbenzene, (10.0) p-Xylene, (10.6) o-Xylene, (12.0) Benzene, 1-ethyl-3-methyl-, (12.2) Benzene, 1,2,3-trimethyl-, (12.8) Benzene, 1,2,3-trimethyl-, (13.7) Benzene, 1,2,4-trimethyl-, (14.0) Indane, (14.7) Indene, (14.8) Indene, (14.9) 1H-Indene, 2,3-dihydro-2-methyl-, (16.2) 1H-Indene, 2,3-dihydro-5-methyl-, (16.9) 1H-Indene, 1-methyl-, (17.0) 1H-Indene, 2,3-dihydro-4,7-dimethyl-, (18.1) Naphthalene, (20.3) Naphthalene, 2-methyl-, (20.6) Naphthalene, 1-methyl-, (22.0) Naphthalene, 2-ethyl-, (22.3) Naphthalene, 2,6-dimethyl-, (22.5) Naphthalene, 2,6-dimethyl-, (22.6) Naphthalene, 2,6-dimethyl-.

A comparison of the condensable product distribution is shown in Table 1. The MSU-MFI catalysts produced less solid product (char and coke) and more vapors (condensable and non-condensable) than conventional ZSM5. The yield of aromatics was higher for the mesoporous catalysts M1 through M4 prepared with smaller polymer (by up to 15% for M1) when compared with microporous ZSM5. Catalysts M5 and M6 had larger pores and smaller micropore volume, which may have contributed to lower aromatic yields. Due to challenges associated with using the microscale setup of the pyroprobe-GC/MS system and inherent variability in biomass, the standard deviations on yield data were high. Therefore, a minimum of six replicates and often more, were tested to obtain more confident estimates of the average yield values (Table 1). All mesoporous catalysts produced lower amounts of char and coke than microporous ZSM5. ZSM5 also showed a much greater aromatic selectivity for C6 (benzene) and C7 (toluene) while the larger pore MSU MFI catalysts were selective towards C8 (e.g. p-xylene) and C9 monoaromatics Aromatic carbon selectivity is defined as the moles of carbon in an aromatic group divided by the total amount of carbon in the condensable product.

overnight at 110° C., calcined in air at 550° C. for 5 h, reduced in a hydrogen stream at 500° C. for 4 h, and finally calcined in air at 550° C. for 5 h to generate the highly dispersed active $Ga^{3+}$ species. The amount of Ga was determined by acid digestion and ICP-MS. The amounts of Ga are reported as mole percent relative to aluminum.

Example 5

Pyrolysis Experiments with Poplar as Feedstock Using the Catalysts Prepared in Example 4

Ga loading on the mesoporous MFI catalyst, M1 with five levels of Ga was tested: 0.25, 0.5, 1, 2, and 3% (mol % relative to aluminum). Catalytic pyrolysis experiments with

TABLE 1

Comparative product yields for catalysis and pyrolysis of poplar with MFI catalysts (without Gallium)

| Product distribution | M1 | M2 | M3 | M4 | M5 | M6 | ZSM5 |
|---|---|---|---|---|---|---|---|
| Pyrolysis vapors | 59.2 ± 2.6 | 59.0 ± 3.2 | 60.3 ± 6.8 | 59.3 ± 6.0 | 58.3 ± 8.4 | 56.2 ± 3.0 | 52.5 ± 3.0 |
| Char + Coke | 40.8 ± 1.9 | 41.0 ± 3.9 | 39.7 ± 6.2 | 40.7 ± 3.9 | 41.7 ± 6.2 | 43.81 ± 3.9 | 47.5 ± 3.0 |
| Relative Aromatics yield | 1.15 ± 0.22 | 1.06 ± 0.05 | 0.99 ± 0.35 | 1.09 ± 0.18 | 0.85 ± 0.16 | 0.68 ± 0.18 | 1.00 ± 0.19 |

*Aromatic yield of 1.00 = 1.8% w/w dry biomass. All data in this study are an average of six replicates. Pyrolysis vapors includes condensable fraction (bio-oil) as well as non-condensable gases. Char + Coke includes char produced from pyrolysis of biomass and coke deposited on catalyst during catalytic reaction that follows pyrolysis.

Example 4

Gallium Loading of MFI-Type Zeolite M1

Mesoporous MSU-MFI zeolite catalysts M1 were doped with gallium in the form of aqueous gallium nitrate using the incipient wetness method. X-ray diffraction analysis showed no major in crystal structure due to presence of Ga. BET analysis showed that a 3% Ga deposition reduced the surface area by 10-30 $m^2/g$. ICP-OES was used to confirm the Ga poplar as feedstock and Ga MFI catalyst showed that incorporation of Ga increased aromatic yields up to 1% loading, beyond which a decrease in yield was observed (Table 2). The char yield was also affected and decreased with an increase in Ga loading. The selectivity for smaller C6 and C7 aromatics increased slightly with Ga loading. The M1 catalyst without any Ga produced the highest yields of C8 aromatics.

TABLE 2

Comparison of aromatic yields from poplar fast pyrolysis with M1 catalyst loaded with different quantities of Gallium (by weight).

| Product distribution | Control | 0.25%-Ga | 0.50%-Ga | 1.0%-Ga | 2.0%-Ga | 3.0%-Ga |
|---|---|---|---|---|---|---|
| Pyrolysis vapors | 59.2 ± 2.26 | 59.9 ± 0.9 | 59.4 ± 0.11 | 60.8 ± 1.7 | 61.4 ± 0.9 | 61.6 ± 1.28 |
| Char + Coke | 40.8 ± 1.9 | 40.1 ± 0.9 | 40.6 ± 1.7 | 39.2 ± 1.28 | 38.6 ± 1.0 | 38.4 ± 0.16 |
| Relative Aromatics yield | 1.00 ± 0.09 | 1.15 ± 0.04 | 1.16 ± 0.12 | 1.21 ± 0.05 | 0.97 ± 0.30 | 1.01 ± 0.07 |

*Aromatic yield of 1.00 = 2.1% w/w dry biomass.

loading on catalysts. X-ray photoelectron spectroscopy confirmed the presence of Ga on catalyst surfaces with a binding energy of 1118 eV corresponding to $Ga2p_3$, which may be attributed to an oxidation state of 3+ on catalyst surface. Gallium loaded catalysts (0.25, 0.5, 1, 2, 3% Ga) were prepared using an appropriate amount of aqueous gallium nitrate (Aldrich, 99.9%) solution using the incipient wetness method as set forth in V. Shetti, J. Kim, R. Srivastava, M. Choi, and R. Ryoo, "Assessment of the mesopore wall catalytic activities of {MFI} zeolite with mesoporous/microporous hierarchical structures," *Journal of Catalysis*, vol. 254, no. 2, pp. 296-303, March 2008, incorporated herein by reference in its entirety. The treated catalysts were dried

What is claimed is:

1. A zeolite catalyst having a Mordenite framework inverted structure and an average intracrystal mesopore size of in the range from about 2.0 to about 5.0 nm, wherein the catalyst further comprises Ga in an amount from 0.1% to 1 mol %.

2. The zeolite catalyst of claim 1, having a pore size distribution in the range from about 1.0 to about 1.5 nm width at half maximum height.

3. The zeolite catalyst of claim 1, having a BET surface area in the range from about 350 to about 700 $m^2/g$.

4. The zeolite catalyst of claim 1, an average pore volume in the range from about 0.1 to about 1.0 $cm^3/g$.

5. The zeolite catalyst of claim 1, having an average micropore volume in the range from about 0.05 to about 0.2 cm$^3$/g.

* * * * *